April 25, 1950   G. E. COATS   2,505,172
TIRE CHANGING STAND WITH A ROTATABLE
TOOL SUPPORTING SHAFT
Filed May 8, 1947   3 Sheets-Sheet 2
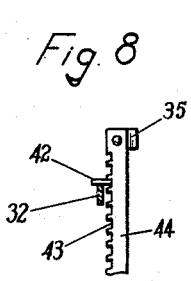
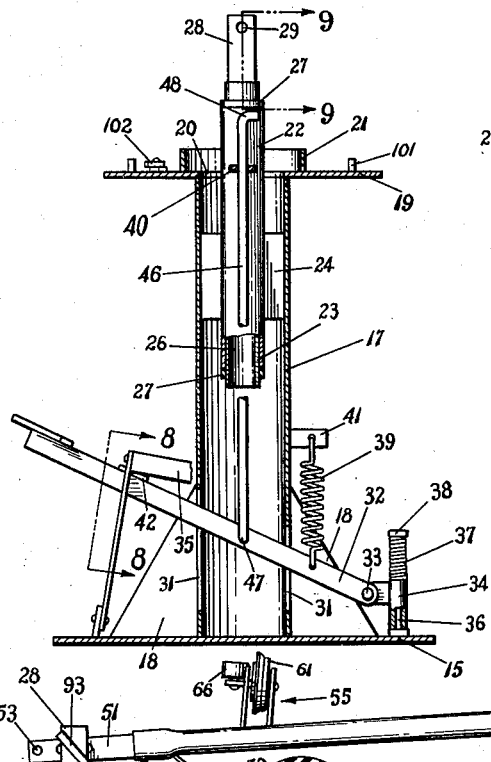
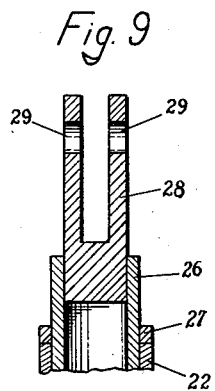
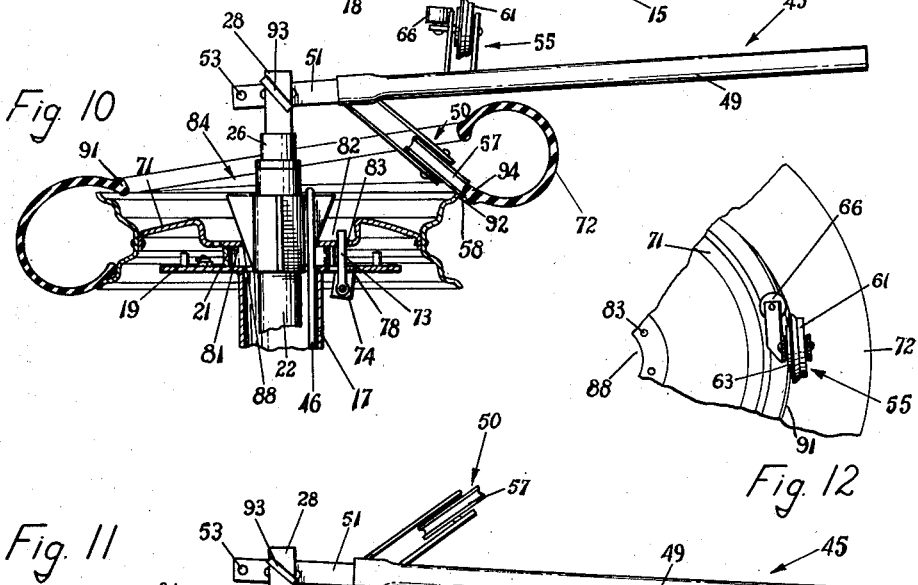
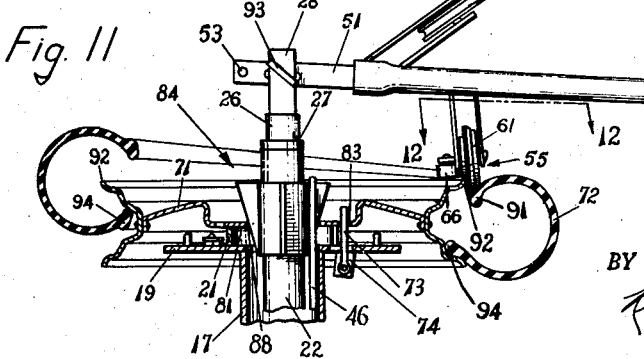
INVENTOR.
Gilbert E. Coats
BY
Rudolph L. Lowell
ATTY.

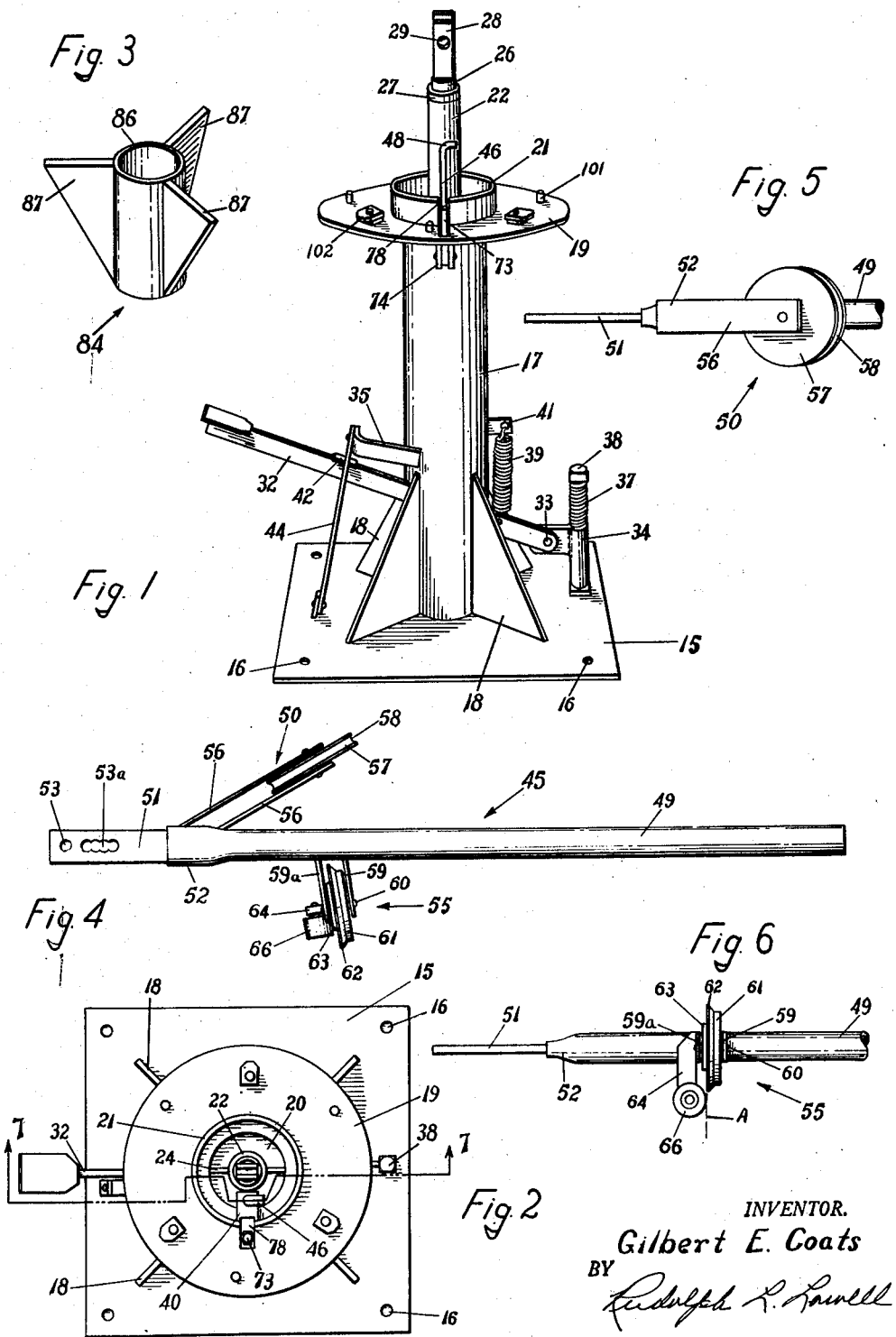

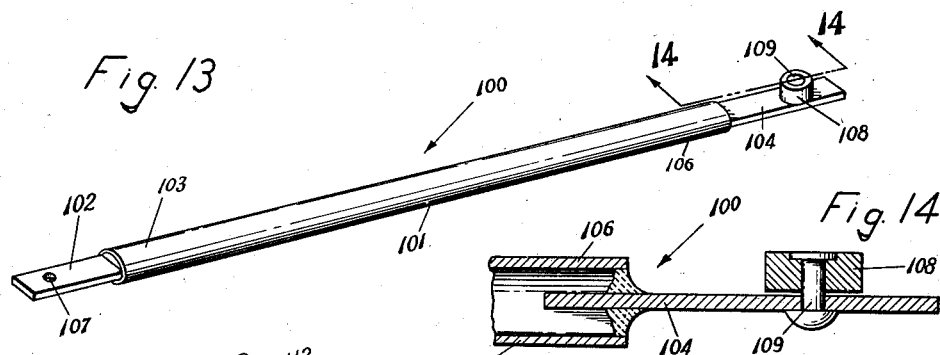
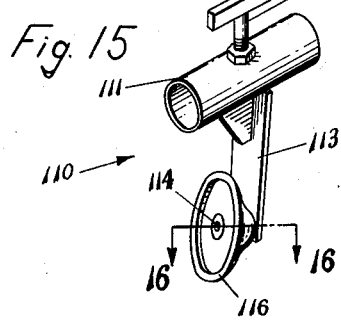
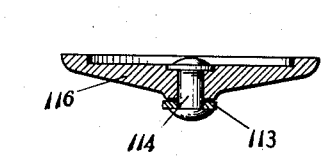
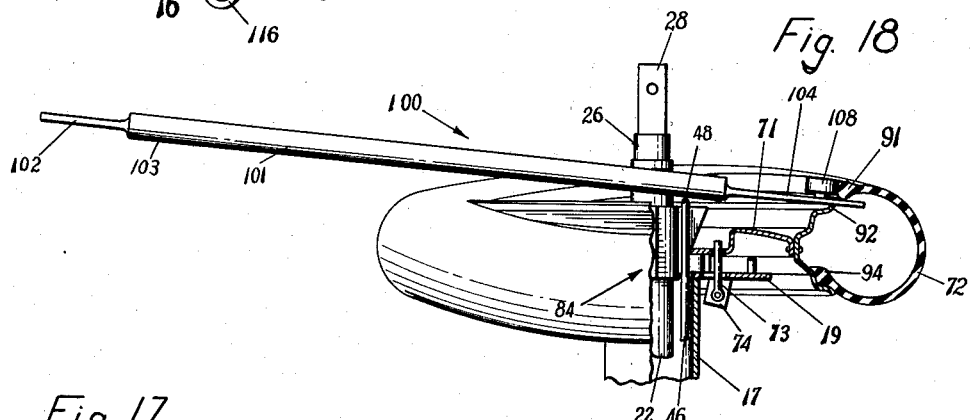
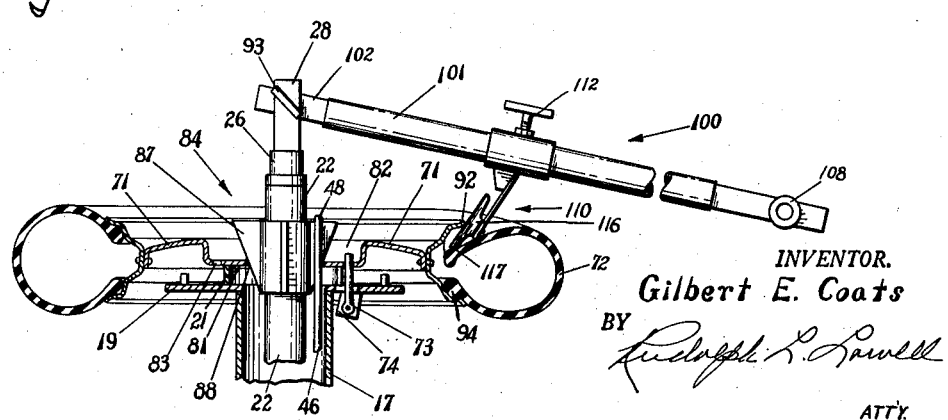

Patented Apr. 25, 1950

2,505,172

UNITED STATES PATENT OFFICE 2,505,172

TIRE-CHANGING STAND WITH A ROTATABLE TOOL SUPPORTING SHAFT

Gilbert E. Coats, Fort Dodge, Iowa

Application May 8, 1947, Serial No. 746,749

1 Claim. (Cl. 144—288)

This invention relates to a device for removing and replacing a tire on a vehicle rim.

At the present time much difficulty and inconvenience is generally encountered in tire shops and garages in removing tires from and replacing tires on vehicle rims, particularly on rims of so-called drop center type, which are now in common use. These operations are usually accomplished by the use of tire arms, much effort and an appreciable amount of hammering. By this procedure the rims are often times damaged, the tire casing bruised, and the tire tube many times pinched within the casing.

It is an object of this invention, therefore, to provide an improved device for changing tires.

Another object of this invention is to provide a device for removing a tire from a rim, and replacing the tire on the rim with a minimum amount of time and effort and with a complete elimination of any damage or injury to the tire and rim.

A further object of this invention is to provide a tire changing device for supporting a rim in a fixed centered position and having tire-engaging tools detachably supported for rotation about the axis of the rim adapted, in separate operations, to progressively separate the tire beads from the rim and move the tire beads within the rim.

Another object of this invention is to provide a tire changing device which is of a compact construction so as to occupy a minimum of space in a garage or tire shop, efficient in operation to remove and replace a tire on a rim, and readily applicable to vehicle rims of varying types.

A feature of this invention is found in the provision of a tire changing device in which an upright support has a rotary member projected upwardly from its top end, and means for holding a vehicle rim in a stationary horizontal centered position relative to the rotary member. A first tool, movable about the rotary member as a fulcrum is adapted to separate and remove the tire beads from the rim. A second tool, detachably pivoted at one end on the rotary member for up and down pivotal movement, and for rotational movement about the rim, has a pair of oppositely arranged tire engaging units which are operable, on independent rotational movements of the second tool about the rim, to accomplish in succession the replacement of the tire beads on the rim.

Further objects, features and advantages of this invention will become apparent from the following description when taken in connection with the accompanying drawings, in which:

Fig. 1 is a perspective view of the tire changing device of this invention with parts thereof removed for the purpose of clarity;

Fig. 2 is a plan view of the device shown in Fig. 1;

Fig. 3 is a perspective view of a clamp member for a vehicle rim which forms part of the tire changing device;

Fig. 4 is a side elevational view of a tire tool forming part of the tire changing device, which is used to replace a tire on a rim;

Fig. 5 is a fragmentary plan view of the tool shown in Fig. 4 with parts removed;

Fig. 6 is a fragmentary bottom plan view of the tool shown in Fig. 4 with parts removed;

Fig. 7 is a sectional view taken substantially on the line 7—7 in Fig. 2 with certain parts shown in elevation and other parts broken away to more clearly show the construction of the device;

Fig. 8 is a detail sectional view on the line 8—8 in Fig. 7;

Fig. 9 is an enlarged detail sectional view as seen on the line 9—9 in Fig. 7;

Fig. 10 is a fragmentary sectional view showing the vehicle rim in assembly relation with the tire changing device, and the tool of Fig. 4 in position for replacing the lower tire bead on a rim;

Fig. 11 is illustrated similarly to Fig. 10 and shows the tool of Fig. 4 in position for replacing the upper tire bead on a rim;

Fig. 12 is a fragmentary sectional view as seen on the line 12—12 in Fig. 11;

Fig. 13 is a perspective view of a tire tool for removing a tire from a rim and which forms part of the tire changing device of this invention;

Fig. 14 is an enlarged detail sectional view taken on the line 14—14 in Fig. 13;

Fig. 15 is a perspective view of an attachment for the tool in Fig. 13 for initially breaking the tire bead from a rim;

Fig. 16 is an enlarged sectional view as seen on the line 16—16 in Fig. 15;

Fig. 17 is a view illustrated similarly to Fig. 10 showing the relative assembly of the attachment in Fig. 15 and the tool in Fig. 13 for breaking the upper tire bead from a rim; and Fig. 18 illustrates the use of the tool in Fig. 13 for removing the upper tire bead from a rim.

With reference to the drawings, the tire changing device of this invention is illustrated in Figs. 1 and 2 as including a flat base 15 adapted to be secured to a floor surface by the provision of anchor bolts (not shown) extended through the base openings 16. Projected upwardly from a central position on the base 15 is a tubular standard or support 17, which is braced relative to the base by gusset or brace plates 18. Mounted on the upper end of the standard 17, in a concentric relation therewith, is a horizontal laterally extended circular flange 19, formed with a central opening 20 corresponding in size substantially to the inner diameter of the standard 17. Secured, as by welding, to the upper side of the flange 19, and in a concentric relation therewith, is an upright ring member 21 of a diameter greater than the diameter of the tubular standard 17.

Coaxially arranged in a spaced relation within the standard 17 and projected upwardly from its upper end through the flange opening 20 and ring 21, is a tubular bearing 22, the lower end 23 of which terminates about midway between the opposite ends of the standard 17 (Fig. 7). The bearing 22 is supported in a fixed spaced relation within the standard 17 by the provision of wing or brace members 24. A tubular rotary member 26 is rotatably supported within the bearing 22 and is maintained against axial movement relative thereto by means of collar members 27 carried at opposite ends of the rotary member and adapted for abutting engagement with the corresponding opposite ends of the bearing 22. Extended within the upper end of the rotatable member 26, and secured thereto as by welding, is a bracket member 28 (Fig. 9) of a substantially U-shape formed with oppositely arranged openings 29 in the legs thereof.

The lower end of the tubular standard 17 is formed with a pair of oppositely arranged axially extended slots 31 (Fig. 7) for receiving a foot operated lever 32 having one end pivoted at 33 to a collar member 34 floatingly carried on an upright bolt 36 secured to the base 15. The collar member 34 is biased in a downward direction by the action of a coil spring 37 mounted about the bolt 36 and arranged in compression between the bolt head 38 and the collar 34.

The lever 32 is yieldably movable in an upward direction, or clockwise, as viewed in Fig. 7, by the provision of a tension spring 39 connected at its lower end to the lever 32 at a position adjacent to its pivoted end, and at its upper end to a radially extended projection 41 carried on the standard 17.

A catch member 42 (Figs. 7 and 8) is secured to the lever 32 at a position near its free end, and is adapted to be selectively engaged with one of the notches 43 formed in an upright lock bar 44 secured at its lower end to the base 15 and having its upper end supported by a brace member 35 carried on the standard 17. The lever 32, on being depressed, is thus movable to an engaged position with a notch 43, and on release from a notch is moved upwardly by the action of the spring 39. The function of the floating collar 34 will appear later.

Arranged within the standard 17 and extended axially thereof is a clamp rod 46 (Figs. 1 and 7) which is pivotally connected at its lower end 47 with the foot lever 32. The upper portion of the clamp rod is slidably extended through a bearing 48 and has a hook 48 formed at its upper end. When the lever 32 is in its upwardly moved position, as illustrated in Fig. 7, the hook 48 is positioned above the level of the ring member 21.

A tire-engaging tool, indicated generally as 45, (Figs. 4, 10 and 11) includes a tubular handle member 49 having a flat bar member 51 extended axially outwardly from its end 52. The bar 51 is formed with a series of adjustment holes 53 and 53a with the hole 53a being of a substantially slot shape with serrated side walls formed by drilling holes closely together.

The tool 45 is provided adjacent its end 52 with a first tire-engaging unit, indicated generally as 50 (Figs. 4 and 5), for placing on a wheel rim what shall hereinafter be referred to as the lower bead of a tire. The unit 50 includes a pair of spaced laterally extended supports 56 which are inclined at an angle away from the handle end 52. Rotatably supported at the free ends of the supports 56 is a usual type sheave or pulley 57 having a peripheral groove 58.

Arranged on the handle 49 at a position opposite from the unit 50, is a second tire-engaging unit 55 (Figs. 4 and 6) for replacing on a wheel rim what shall hereinafter be referred to as the upper bead of a tire. The unit 55 has a pair of spaced laterally extended supports 59 and 59a which are inclined away from the handle end 52 at an angle less than the angle of inclination of the supports 56 in the unit 50. Rotatably supported adjacent the free ends of the supports 59 and 59a on a pin 60 is a rotary member 61 having a peripheral flange 62 on only one of its sides. In practice the member 61 is formed from a usual type sheave, by merely removing one of the sheave side faces.

A collar member 63, coaxial with the rotary member 61 is also carried on the pin 60 between the supports 59. As best appears in Fig. 4, it is seen that both the member 61 and collar 63 extend beyond the free ends of the supports 59 and 59a. Extended laterally from the support 59a is a bracket member 64 on which a roller 66 is rotatably supported. The support 59a, bracket 64 and roller 66 are relatively arranged and constructed so that the roller 66 is positioned outwardly from one side of the rotary member 61 such that the plane of the flange 62, indicated at A in Fig. 6, is substantially tangential to the roller 66 for a purpose which will later appear.

The tool, designated generally as 100 in Figs. 13 and 14, is provided for the purpose of removing a tire from a rim and includes a tubular handle 101 having a first flat bar 102 extended longitudinally from its end 103, and a second flat bar 104, of a length longer than the bar 102, projected longitudinally from its opposite end 106. The bar 102 is formed with an opening 107, while the bar 104 rotatably carries a roller 108 on a pin 109 extended normal to the plane thereof.

A bead breaking attachment 110 (Figs. 15 and 16), for the tool 100, has a tubular body member 111 slidably receivable on the handle 101 and maintained in a longitudinally adjusted position on the handle by a friction or lock screw 112. Projected laterally from the body member 111, at a position substantially opposite the lock screw 112, and at a slight angle relative to the axis of the member 111, is a flat arm 113 having a stub shaft 114 adjacent its free end. The shaft 114 is normal to the plane of the arm 113 and rotatably supports a substantially cone shape disc 116.

In the operation of the tire changing device, let it be assumed that a vehicle rim 71 (Fig. 17) of a type generally used on Pontiac and Chevrolet cars, is to have the tire 72 thereon changed. For rims of this type the device is equipped with a pin or dowel 73 (Figs. 1, 2 and 17) which is arranged in an upright position adjacent to the upper end of the standard 17, and pivoted at its lower end for movement radially of the standard, between a pair of spaced lug members 74, which are supported from the underside of the annular flange 19. The dowel 73 extends through the flange 19 and is pivotally movable in a slot 78 formed in the flange 19 and ring 21.

The rim 71 (Fig. 17) is arranged in a flat horizontal position with its inner side 81, relative to its position on a car, resting on the top of the ring 21. Stated otherwise, the central rim cavity 82, which is closed by a usual hub cap (not shown) is faced upwardly. With the rim in this horizontal position the dowel 73 is moved so as to extend through one of the axle bolt holes 83 in the rim side 81 to hold the rim against rotation. It is seen, therefore, that the rotary member 26 projects upwardly above the level of the tire and rim assembly.

The rim 71 is then centered relative to the standard 17 and in turn to the rotary member 26, by the provision of a wedge or clamp member 84 (Figs. 3 and 17), having a tubular hub member 86 which is loosely received about the upper end of the bearing sleeve 22. A series of radially extended tapered wings 87 are adapted to extend within and engage the rim side 81 at the usual central opening 88 therein.

With the clamp member 84 thus positioned, as shown in Fig. 17, the foot lever 32 is released from the notched lock member 44, to permit the upward movement of the clamp rod 46 within the standard 17 in response to the action of the spring 39. The hook 48 is then positioned over one of the wings 87 and the foot lever 32 is depressed to rigidly clamp and center the rim 71 with the standard.

By virtue of the floating collar 34, the lever 32 is prevented from being locked at a position providing for the location of the catch member 42 between adjacent notches. In other words, the clamp rod 46 can always be pulled downwardly to a firmly wedged position of the member 84 by the action of the spring 37 to permit an upward movement of the collar 34.

With the rim and tire assembly thus firmly locked in a centered position on the standard 17, the tool 100 is pivotally connected at its end 103 to the bracket 28 by positioning the bar 102 between the bracket legs and inserting a pin 93 between the aligned openings 29 and 102 (Fig. 17).

The bead breaking attachment 110 is then mounted on the handle 101, with the arm 113 extended downwardly and inclined toward the handle end 103, and moved toward the handle end 103 until the lower peripheral edge 117 of the disc 116 is against the outer peripheral edge 92 of the rim 71. The lock screw 112 is then tightened to hold the attachment 110 against movement longitudinally of the tool 100.

With the tool 100 and attachment 110 thus relatively assembled and supported on the rotary member 26 the handle 101 is pivoted back and forth and moved about the rim 71, concurrently with being pressed downwardly against the upper bead 91 of the tire 72, as shown in Fig. 17. In this manner the bead 91 is completely broken away from the rim 71.

On the completion of this operation the attachment 110 is removed from the tool 100, which is then disconnected from the rotary member 22 by taking out the pin 93.

The tool 100 is then gripped adjacent to its end 103 and manipulated as a tire arm to provide for the insertion of that portion of the flat bar 104, located outwardly from the roller 109, between the bead 91 and the peripheral edge 92 of the rim 71 (Fig. 18). By pressing downwardly on the tool end 103 that part of the bead 91 engaged by the bar 104 is separated from the rim 71. With this separation effected, the bar 104 is moved inwardly of the tire 72 until the roller 108 engages the bead 91.

The tool 100 is then moved against the upper projected end of the bearing 22, and with the bearing as a fulcrum is moved about the rim 71 to progressively separate the bead 91 from the rim. The engagement of the roller 108 with the bead 91 substantially holds the tool 100 against longitudinal movement relative to the bearing 22, and prevents the insertion of the bar 104 within the tire 72 to an extent which would result in injury to the tire tube (not shown).

When the upper bead 91 is separated from the rim 71, the tire is moved upwardly on the rim to locate the bottom bead 94 below the peripheral edge 92 of the rim 71. The tool 100 is then manipulated, similarly to its operation for the upper or top bead 91, to provide for the separation of the lower bead 94 from the rim. The tire 72 is thus freed of the rim so as to be lifted therefrom for repair purposes.

To replace the tire on the rim, it is positioned with its lower bead 94 adjacent to the rim edge 92 (Fig. 10). The tire tool 45 is then arranged with the tire engaging unit 50 extended downwardly and is pivotally connected at its end 52 with the rotary member 26 by placing the bar 51 between the legs of the U-member 28 and inserting the pin 93 through the aligned openings 29 and an opening 53 and 53a. The selection of an opening 53 and 53a is determined by a position of the tool 45 such that the outer edge of the sheave 57, in the tire engaging unit 50, receives the bead 94 within the annular groove 58, when the handle 49 is extended radially from the support 17 in a substantially horizontal position above the tire and rim assembly.

With the tool 45 thus positioned, as illustrated in Fig. 10, the handle 49 is moved about the rim 71 whereby the bead 94 is progressively moved to the outside and below the rim edge 92 by the sheave 57. As a result the bead 94 is completely replaced on the rim by the rotation of the handle 49 through one complete revolution about the rim. On completion of this operation the tire 72 is moved downwardly on the rim 71 so that the upper bead 91 is above the rim edge 92. The tool 45 is then removed by pulling out the pin 93, and is pivotally connected with the bracket 28 in an inverted position, relative to its showing in Fig. 10, so that the tire-engaging unit 55 extends downwardly, as illustrated in Fig. 11, with the flange 62 of the rotary member 61 against the rim edge 92.

By pressing downwardly on the free end of the handle 49, the upper bead 91 is moved below the rim edge 92 to an extent determined by the engagement of the collar 63 with the rim edge 92. At this downwardly moved position the roller 66 is engageable with the inner peripheral surface of the tire bead 91, as shown in Fig. 12. On rotation of the handle 49 in a direction such that the roller 66 is in a leading relation with the rotary member 61, the bead 91 is progressively moved to the outside of the rim edge 92 by the roller 66, and within the rim by the action of the rotary member 61.

After the bead 91 has been replaced within the rim, the tool 45 is removed from the device, and the foot lever 32 is released to free the clamp rod 46 from its engaged position with the clamp member 84. On removal of the clamp member the tire and wheel assembly are lifted from the standard 17.

A like operation of the device takes place for rims of the type used on Ford V-8 automobiles except that the stationary upright dowels 101 and clip members 102 on the flange 19 are used in place of the pivoted dowel 73 for holding the rim against rotation relative to the support 17.

From a consideration of the above description, it is seen that the invention provides a tire changing device which is of a simple and compact construction, and adapted to efficiently and easily break a tire loose from a rim, remove the tire from the rim, and then replace the tire on the rim with a minimum of inconvenience. The device is applicable to operate on a wide variety of tire and rim assemblies and accomplishes a complete tire change in a series of successive and continuous operations.

Although the invention has been described with respect to a preferred embodiment thereof, it is to be understood that it is not to be so limited since changes and modifications can be made therein which are within the full intended scope of this invention, as defined by the appended claim.

I claim:

In a device for removing and replacing a tire on a wheel rim having a center opening therein, an upright tubular member adapted to support the rim in a horizontal position on the upper end thereof, a bearing member concentrically arranged within said support and projected from the upper end thereof to receive loosely the center opening of said wheel rim, a shaft rotatably supported within said bearing member having the upper end thereof projected upwardly from said bearing member, a tire-engaging unit connectible with the upper end of said shaft, means for locking said rim on the support in a centered position therewith including a tubular wedge member slidably receivable on the projected end of said bearing member and adapted to enter the center opening of said rim, means for clamping said wedge member downwardly between said bearing member and the wall of said center opening including an upright vertically movable clamp member positioned between said support and bearing member having a wedge engaging portion at its upper end, and means for moving said clamp member into and out of a wedge-clamping position.

GILBERT E. COATS.

REFERENCES CITED

The following references are of record in the file of this patent:

UNITED STATES PATENTS

| Number | Name | Date |
|---|---|---|
| 643,528 | Palmer | Feb. 3, 1900 |
| 965,076 | Carle | July 19, 1910 |
| 1,316,390 | Rischard | Sept. 16, 1919 |
| 1,341,726 | Weaver et al. | June 1, 1920 |
| 1,341,727 | Weaver | June 1, 1920 |
| 1,416,094 | Krauska | May 16, 1922 |
| 1,587,634 | Dickey et al. | June 8, 1926 |
| 2,000,036 | Renfro | May 7, 1935 |
| 2,034,819 | Maulis | Mar. 24, 1936 |
| 2,057,200 | McCarthy | Oct. 13, 1936 |
| 2,075,421 | Bennett | Mar. 30, 1937 |
| 2,171,282 | Wochner | Aug. 29, 1939 |
| 2,201,982 | Bazarek | May 28, 1940 |